United States Patent
Salgado (10) Patent No.: US 8,665,461 B2
(45) Date of Patent: Mar. 4, 2014

(54) METHOD AND APPARATUS TO BIND PRINT TICKETS TO PRINT JOBS FOR CLOUD AND FOLLOW ME PRINTING WORKFLOWCROSS

(75) Inventor: David L. Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 210 days.

(21) Appl. No.: 13/324,218

(22) Filed: Dec. 13, 2011

(65) Prior Publication Data

US 2013/0148145 A1    Jun. 13, 2013

(51) Int. Cl.
*G06F 3/12* (2006.01)
(52) U.S. Cl.
USPC .................................. 358/1.13; 358/1.15
(58) Field of Classification Search
USPC .......... 358/1.1, 1.9, 1.13, 1.15, 400, 401, 407
See application file for complete search history.

(56) References Cited

U.S. PATENT DOCUMENTS

| | | | |
|---|---|---|---|
| 5,619,649 A * | 4/1997 | Kovnat et al. | 358/1.15 |
| 7,409,452 B2 * | 8/2008 | Ragnet et al. | 709/227 |
| 8,209,377 B2 * | 6/2012 | Minamida | 709/203 |
| 8,320,008 B2 * | 11/2012 | Jahn | 358/1.15 |

\* cited by examiner

*Primary Examiner* — Thomas D Lee
(74) *Attorney, Agent, or Firm* — Fay Sharpe LLP (57) ABSTRACT

A system for managing job tickets includes a first device that is in communication with a server. The first device is adapted to receive as input job parameters for managing a print job. The image forming device is further adapted to encode the job parameters into a job ticket. The first device is further adapted to send the job ticket to the server. The server is adapted to store the job ticket in a folder and obtain the job ticket from the folder when a request for a print job is received at the server. The server is further adapted to apply the job ticket to the print job and transmit a print file including the print job and the job ticket to an image forming device when a print job request is received.

19 Claims, 6 Drawing Sheets

METHOD AND APPARATUS TO BIND PRINT TICKETS TO PRINT JOBS FOR CLOUD AND FOLLOW ME PRINTING WORKFLOWCROSS

BACKGROUND

The present disclosure is directed toward an apparatus and a method for creating and managing print job tickets and, more specifically, to a system that creates a print job ticket at a printing device, stores the ticket at a server, and receives a print job submission with a selection for the ticket at a mobile client device.

Direct printing is a type of printing workflow or path in which a client device is directly connected to an image forming device. In this manner, a print job request that is provided by the client device is sent directly to the image forming device for rendering a print output. In indirect printing, the client device is indirectly connected to the image forming device. Therefore, the print job request may be sent, for example, to a server, which relays the request to the image forming device.

There are two types of indirect printing workflows prevalent in the marketplace. A first type includes cloud printing, whereby a select image forming device may be specified for rendering a print job when the print job request is made at a remote client device. A cloud print service acts as an intermediary agent and forwards the job to the selected device. The second type of workflow includes pull printing (also referred to as 'follow-me printing'), whereby the print job can be selected from a list provided on an interface at the image forming device. The list is provided by a print server, which sends the selected print job to the image forming device. Accordingly, both types of indirect printing workflows use a print service residing on a public or an internally shared server for receiving print job requests and relaying the requests to the image forming device.

These workflows are adapted to receive the print job requests from mobile client devices that have small user interfaces, such as, for example, smart phones, personal digital assistants (PDAs), and tablet personal computers (PCs). However, these existing devices are not adapted to select advanced, user-specified printing features. A small basic set of printing features is a limitation in the existing applications of these workflows. A workflow for managing print jobs is therefore desirable for enabling advanced print features to be selected using the hand held device.

BRIEF DESCRIPTION

A first embodiment of the present disclosure is directed toward a job ticket managing system including an image forming system that is in communication with a server for managing job tickets. The job ticket managing system includes a processor that is adapted to receive as input job parameters for managing a print job. The job ticket managing system further includes a print driver that is adapted to encode the job parameters into a job ticket. The job ticket managing system further includes a print engine that is adapted to send the job ticket to the server and receive a job file from the server. The job file includes a print job and the job ticket.

Another embodiment of the present disclosure relates to a system for managing job tickets. The system includes a first device that is in communication with a server. The first device is adapted to receive as input job parameters for managing a print job. The image forming device is further adapted to encode the job parameters into a job ticket. The first device is further adapted to send the job ticket to the server. The server is adapted to store the job ticket in a folder and obtain the job ticket from the folder when a request for a print job is received at the server. The server is further adapted to apply the job ticket to the print job and transmit a print file including the print job and the job ticket to an image forming device when a print job request is received.

An exemplary method for managing job tickets is also provided herein according to an embodiment of the disclosure. The method includes receiving job parameters at a first device for creating a job ticket. The method further includes encoding the job parameters into a job ticket at the first device. The method also includes transmitting the job ticket to a server for storing the job ticket by the first device. The method includes subsequently providing a print job request to the server. The method also includes providing the print job to the server with a request for the job ticket by a second device. The method includes receiving at an image forming apparatus a print file from the associated server, the print file including the print ticket obtained from a repository at the associated server and applied to the print job.

DETAILED DESCRIPTION

The present disclosure relates to a system and method for managing a print job ticket, whereby a print system creates a job ticket and a server stores the job ticket. When a mobile client device submits a print job for a select print engine, the server then applies the job ticket while processing the print job. A print engine receives a print file from the server for producing a hard copy output.

The system is generally adapted to enable indirect printing using advanced printing features selected with mobile client devices. The system is adapted to store print tickets, which are created at the mobile client device, at a print ticket repository included at a remote server. The system is further adapted to subsequently receive a user-selection for the print ticket simultaneous with a print request. Accordingly, the system is adapted to execute the print job by applying the parameters included in the selected print ticket to the print job.

Figure 1:
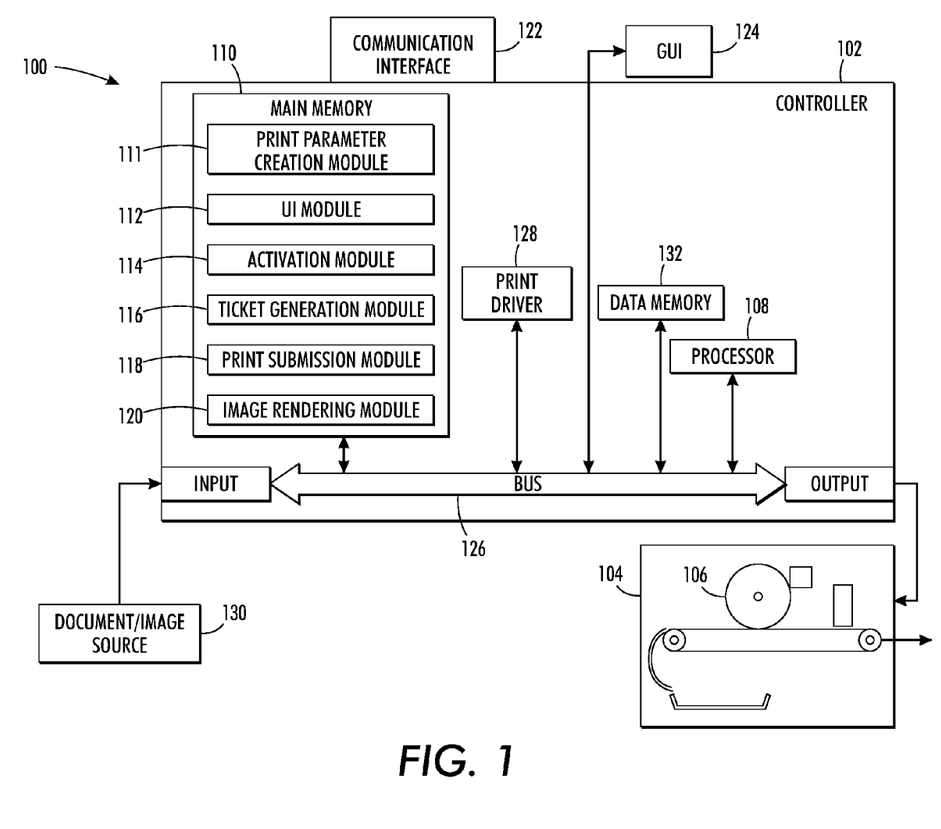
FIG. 1 shows a schematic illustration of an image forming device according to one embodiment.
Figure 2:
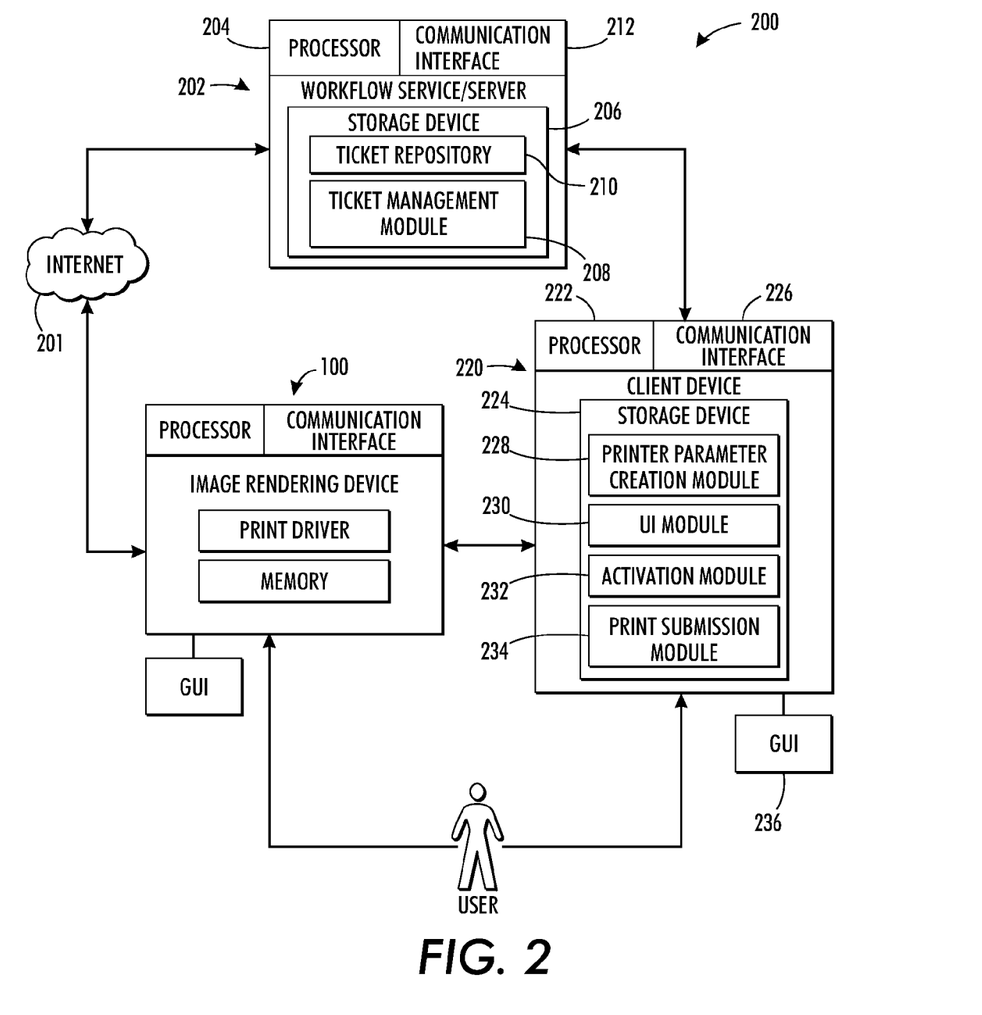
FIG. 2 shows a schematic illustration of a ticket managing system according to one embodiment.

FIG. 1 is a schematic illustration of an image rendering system 100 in one exemplary embodiment. The image rendering system 100 may form a part of a print job ticket managing system 200 (hereinafter referred to as 'ticket managing system'), as illustrated in FIG. 2, which further includes a server 202 and a mobile client device 220, which are linked together by communication links, referred to herein as a network 201. These components are described in greater detail below.

The image rendering system 100 illustrated in FIG. 1 includes a controller 102 that is part of or associated with the illustrated image forming device 104. The exemplary controller 102 is adapted for controlling an operation of at least one marking (or print) engine 106 for forming images on substrates. The image forming device 104 renders images on print media, and can be a copier, laser printer, bookmaking machine, facsimile machine, or a multifunction machine (which includes one or more functions such as scanning, printing, archiving, emailing, and faxing).

Instruction data may be output from the controller 102 for further processing at the ticket managing system 200. The controller 102 includes a processor 108, which controls the overall operation of the image rendering system 100 by execution of processing instructions, which are stored in memory 110 connected to the processor 108.

The memory 110 may represent any type of tangible computer readable medium such as random access memory (RAM), read only memory (ROM), magnetic disk or tape, optical disk, flash memory, or holographic memory. In one embodiment, the memory 110 comprises a combination of random access memory and read only memory. The digital processor 108 can be variously embodied, such as by a single-core processor, a dual-core processor (or more generally by a multiple-core processor), a digital processor and cooperating math coprocessor, a digital controller, or the like. The digital processor, in addition to controlling the operation of the ticket managing system, executes instructions stored in memory 110 for performing the parts of the method outlined in FIGS. 3 and 4 that are performed at the ticket managing system 200. In some embodiments, the processor 108 and memory 110 may be combined in a single chip.

The image rendering system 100 may be embodied in a networked image forming device, although it is also contemplated that the system 100 may be located elsewhere on a network to which the ticket managing system 200 is connected, such as on a server 202, networked computer, or the like, or distributed throughout the network 201 or otherwise accessible thereto. The pairing connection disclosed herein is performed by the processor 108 according to the instructions contained in the memory 110. In particular, the memory 110 stores a print parameter creation module 111, which receives selected print parameters, encodes the parameters into a job ticket, and sends the job ticket to a remote server. A job ticket generation module 112 encodes selected parameters into a job ticket and transmits the ticket to the server. A user interface (UI) module 114 receives a user-instruction for initiating a print request. An activation module 116 connects the image rendering system 100 to the server 202 for querying the server for accessible tickets. A print submission module 118 receives a list of accessible tickets from the server, receives a user-selection for a ticket selected from the list, and relays the ticket selection to the server with the print job. An image rendering module 120 receives the print job file from the server and processes the file to render a print job output. These modules 111-120 will be later described with reference to the exemplary method.

The software modules as used herein, are intended to encompass any collection or set of instructions executable by the image rendering system 100 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server 202 or other location to perform certain functions.

With continued reference to FIG. 1, image rendering system 100 also includes one or more communication interfaces, such as network interfaces 122 for communicating with external devices. The communication interfaces 117, 118 may include, for example, a modem, a router, a cable, and/or Ethernet port, etc.

With continued reference to FIG. 1, the image rendering system 100 can further include a graphical user interface (GUI) 124 adapted to receive the job parameters as user provided input. The GUI 124 can include a display, for displaying information, such as ticket lists and/or parameters lists, to users, and a user input device, such as a keyboard or touch or writable screen, for inputting instructions, and/or a cursor control device, such as a mouse, trackball, or the like, for communicating user input information and command selections to the processor 108. The various components of the image rendering system 100 may be all connected by a bus 126.

The image rendering system 100 may include one or more special purpose or general purpose computing devices, such as a server computer or digital front end (DFE) of the multifunction printer/copier device, or any other computing device capable of executing instructions for performing the exemplary method.

The image rendering system 100 includes a print driver 128 adapted to format the document received in the print job file into a print-compatible language. The print driver is generally in communication with a destination print device through a network.

FIG. 1 further illustrates the image rendering system 100 connected to a document/image source 130 for inputting and/or receiving a document in electronic format. The document source 130 may include an image capture device, such as a scanner, a computer, or the like. The document source 130 is in communication with the controller 102 containing the processor 108 and memories 110, 132.

In another embodiment, the document/image data 130 may be input from any suitable document source 130 such as a workstation, a database, a memory storage device, such as a disk, or the like.

The exemplary image rendering system 100 includes an image forming device 104. The image forming device 104 includes a marking engine 106, which applies marking medium, such as ink or toner, to a substrate, such as paper, using, for example, a laser, inkjet, thermal, or other transfer process.

With reference to FIG. 2, the ticket managing system 200 includes a server 202 in communication with the image rendering system 100. The server 202 includes a processing device 204 and memory, such as storage device 206, or has access to a storage device 206, for storing software modules executable by the processing device 204. The storage device 206 stores software instructions for implementing the server-side parts of the exemplary method shown in FIGS. 3 and 4. In particular, the instructions include a job ticket management module, which provides a GUI with a list of job parameters, receives a job ticket including user-selected parameters, provides a list of accessible job tickets in response to a query, applies a received job ticket selection to a job file, and sends the job file to the image forming system 100. The server 202 further includes a ticket repository 210, which stores job tickets provided by the image forming system 100. The server 202 further includes a communication interface 212 including hardware and/or software suitable for providing wired or wireless data communication with the image forming system 100 and the mobile client device 220. The processor 204, memory 206, and communication interface 212 can be similarly configured to processor 108, memory 110, and the communication interface 122 of the image forming system 100.

The ticket managing system 200 further includes a mobile client device 220 in communication with the server 202. The exemplary mobile client device includes, for example, a handheld (e.g., Tablet) computer, personal digital assistant (PDA) cellular phone, or microcomputer. The mobile client device 220 includes a processor 222, such as a CPU, memory, such as storage device 224 and/or access to the storage device 224 for storing software modules executable on the processor of the CPU (the storage device 224 or a portion thereof may be included with the CPU), and a communication interface 226 including hardware and/or software suitable for providing wireless data communication with the server 202 and image forming system 100. The memory 224, processor 222, and communication interface 226 can be similarly configured to memory 110, processor 108, and communication interface 122 of the image forming system 100. The exemplary software modules include a print parameter creation module 228, which receives a list of print parameters from the remote server, provides the user with the list, and sends the user-selected parameters to the image forming system 100 with a user-selected folder designation. A user interface (UI) module 230 receives a user-instruction for initiating a print request. An activation module 232 connects the mobile client device 220 to the server 202 for querying the server for accessible tickets. A print submission module 234 receives a list of accessible tickets from the server, receives a user-selection for a ticket selected from the list, and relays the ticket selection to the server. These modules 228-234 will be later described with reference to the exemplary method. The data may undergo processing by the mobile client device 220 and may be displayed to the user in a suitable form on a GUI 236 of the mobile client device 220. In general, the software modules 228-234 of the mobile client device 220 are analogous to or similar to the software modules 112-120 of the image rendering system 100.

Generally, the server 202 can store advanced job parameters options until a user selectively initiates the creation of a job ticket. In one embodiment, the print driver 128 of the image forming system 100 can offer a 'Print-to-Cloud' feature selection including three options: 'Don't-Send-to-Cloud'; 'Send-to-Cloud'; and, 'Send-Print-Ticket'. Now referring to FIG. 3, a method for creating a job ticket is shown. The method starts at S300. The method includes assigning job parameters by a first device at 5302. More specifically, the assignment of job parameters S302 for creating a job ticket can be performed by the mobile client device 220 (see Example 1 below). However, embodiments are contemplated in which the parameters can be selected at the image rendering system 100 (see Example 2 below).

Figure 3:
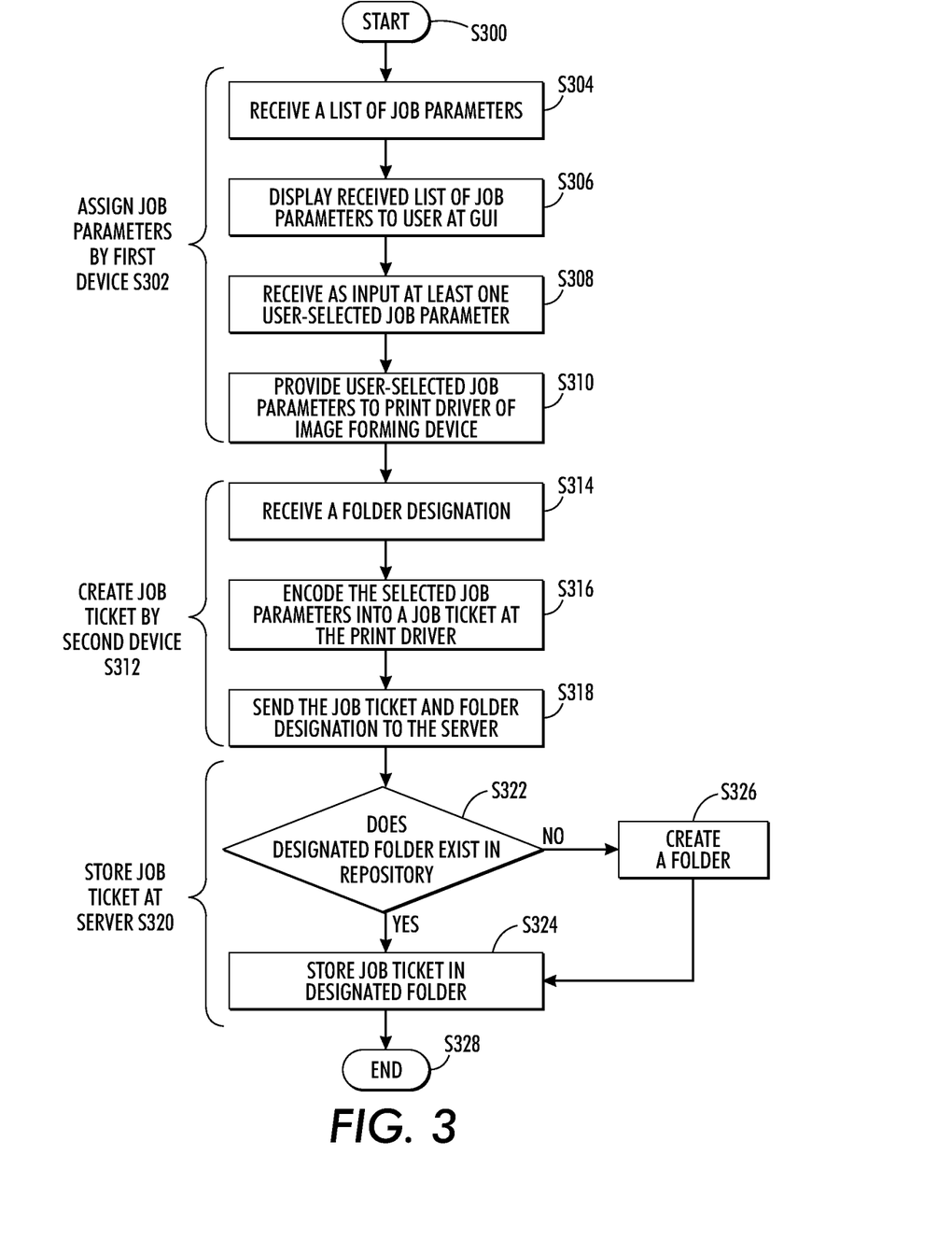
FIG. 3 shows a flowchart illustrating an exemplary method of creating a job ticket according to one embodiment.

The server 202 provides a user interface for adding a print ticket. More specifically, the server 202 provides the first device 220, 100 with a list of job parameters at S304. Example parameters include, but are not limited to, printable areas for various paper sizes, halftones and color profiles, multi-pass operations, paper size options, manual/duplex printing operations, print stock options, and finishing options, such as, for example, hole-punching, binding, and stapling, etc. The options list is displayed on a GUI 236, 124 of the first device 220, 100 at S306. The GUI receives as input at least one user-selected job parameter at S308. At S310, the first device provides the user-selected print parameter to the print driver 128 of the image forming system 100. In one embodiment including the mobile client device 220, the print parameter creation module 228 sends the selected parameters to the image forming system 100, although an embodiment is contemplated in which the print creation module 228 can send the selected parameters to the server 202, which can relay the selections to the image forming system 100.

The selections are received at the communication interface 122 of the image forming system 100. The communication interface 122 is in communication with the print driver 128 and provides the print driver 128 with the selections. In the contemplated embodiment including the first device being the image forming system 100, the print parameter creation module 111 is in communication with the print driver 128 and transmits the parameter selections to the print driver 128 at S310.

With continuing reference to FIG. 3, the method includes the creation of a job ticket at S312 by a second device. A job ticket is an encapsulation for user-selected print features. As mentioned, the second device can be the same as or different from the first device. In the exemplary embodiment, the second device is the image forming system 100. The job ticket generation module 112 can ask the user to designate a ticket folder for storing the job ticket on a display. In one embodiment, the job ticket generation module can transmit the request to the first device if the first device is different from the second device. In another embodiment, the job ticket generation module can assign a designated folder for the job ticket by default. In yet another embodiment, the job ticket generation module can query the server 202 for a list of the previously-created folders. In yet another embodiment, the print driver 128 can provide the user with the ability to specify the type of ticket (e.g., public, private, etc.) when selection of the 'Send-Print-Ticket' feature is determined including, for example in one embodiment, receipt of the name of the print ticket and the name of the folder it will be stored in.

With continued reference to FIG. 3, the image forming system 100 receives the folder designation at S314. The image forming system 100 can receive the folder designation as input at its GUI 124 or it can receive the folder designation as input provided by the mobile client device 220. The image forming system 100 encodes the selected parameters into a job ticket at S216. In one embodiment, the print driver 128 can encode the selected parameters into the print ticket in response to when the user submits a "Send-Print-Ticket" feature. The image forming system 100 sends the job ticket and the folder designation to the server 202 at S318. The submission can also include the user-identification, which can be obtained by the print driver 128 from the mobile client device operating system if the first device is the mobile client 220 and the second device is the image forming system 100. In yet another embodiment, the system 200 can be adapted to receive as user-input a specified print ticket to be used with a particular application. The specified information can also be included with the print ticket. As such, the system 200 can be adapted to determine if the job ticket exists when a user optionally does not select a print ticket at the time the print request is initiated. In this manner, the server 202 determines the application type of the document to be output and applies the job ticket if it is specified for that particular application type.

A System Administrator can specify in the print driver 128 or image forming system 100 the address of the server 202 (i.e., workflow service) that the image forming system 100 should send the ticket to. In one contemplated embodiment, the image forming system 100 can export the creation of the job ticket at S312. Rather, the system 200 can be adapted to receive a local job using a local user interface on the mobile client device 220. In this manner, the operating system of the mobile client device can receive a user-selection for an Export Print feature, which is adapted to send the print ticket to the server 202.

With continued reference to FIG. 3, the server 202 stores the job ticket at S320. Accordingly, the job ticket can be created in advance of a print job request so that the advanced features can be assigned to a subsequently submitted print job, which can therefore be submitted at a mobile client device 220 or at the image forming system 100 or at a different device. The server 202 determines whether or not the designated folder exists in the repository 210 at S322. If the server 202 determines that the designated folder is included in the repository 210 (YES at S322), the server stores the job ticket in the designated folder in the repository at S324. However, if the server 202 determines that the designated folder is not included in the repository 210 (NO at S322), the server 202 creates a folder and designates it for storing the job ticket at S326. In one embodiment, the system 200 can initially or continuously limit access rights for a newly created private folder to the submitting user.

With continued reference to FIG. 3, the server 202 then stores the job ticket in the designated folder in the repository 210 at S324. The print ticket repository 210 can include public and private print ticket folders, wherein the public folder is accessible to all users and the private folder is only accessible to specified users. The server 202 stores the job ticket until the server 202 is notified that a print job request is submitted and that the ticket is selected to be applied to the job. The method ends at S328.

Figure 4:
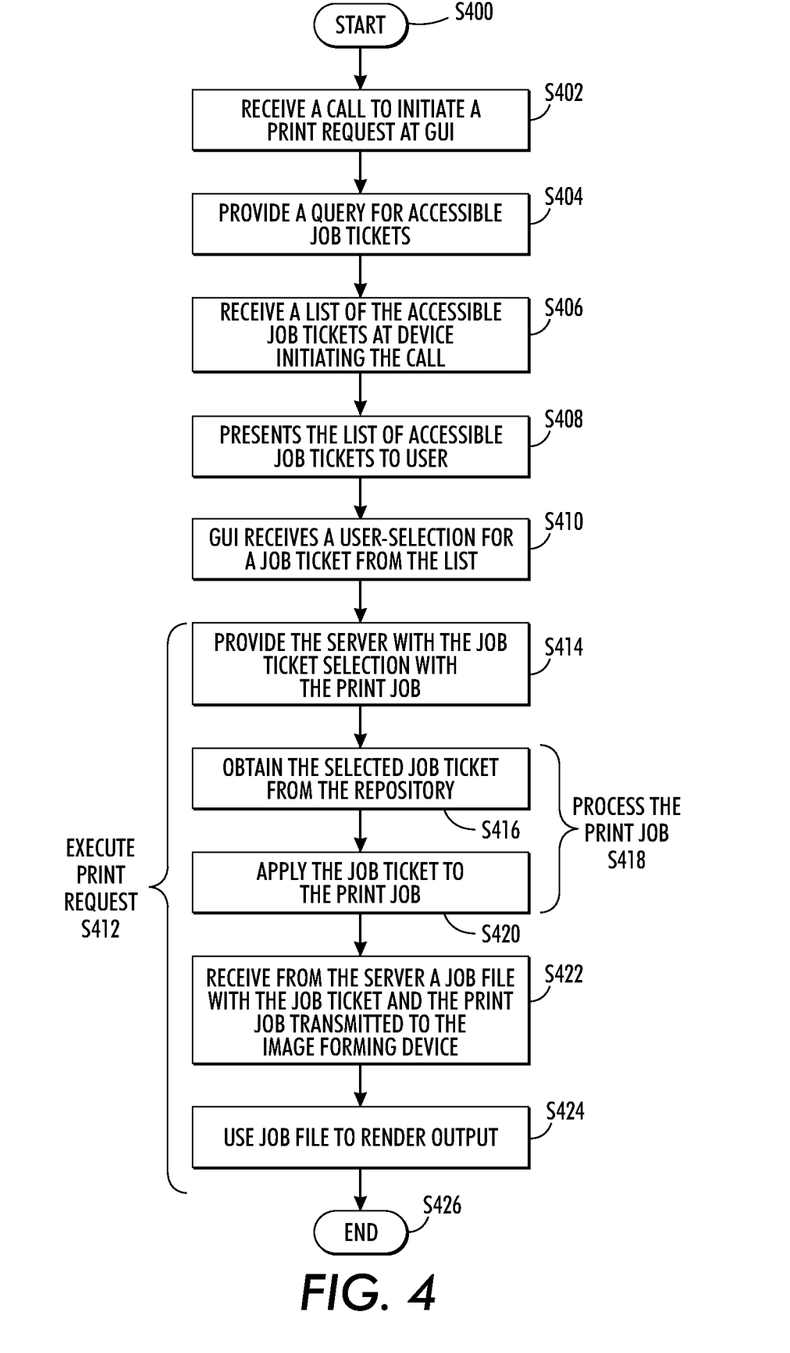
FIG. 4 shows a flowchart illustrating an exemplary method for applying a job ticket to a print job.

Now referring to FIG. 4, a method is shown for applying the stored job ticket to a print job when the print job is submitted. The method starts at S400. A user can submit a print job to the cloud print or follow-me print service by initiating a print request. The print request can be a print capability embedded in or external to an application that submits a document and related information to the workflow service by a supported protocol, such as, for example, via email or an http:/ transfer).

The method includes receiving a call to initiate a print request at a GUI of a device at S402. In the example method, the request may be received as user-input at GUI 236 of the mobile client device 220 or at GUI 124 of the image forming system 100. However, there is no limitation made herein to the type of device adapted to receive the call initiation request. The user interface module determines if a request to render a print job is received.

Continuing with FIG. 4, if the user interface module determines that a request was made, the activation module 116, 232 of the respective device 100, 220 connects the device to the server 202 and sends a query to the server 202 for accessible public and private job tickets at S404. The server 202 searches the repository 210 for the accessible job tickets that the specified user has access to and provides a list to the device 100, 220 that initiated the call. The device 100, 220 receives the list of the accessible job tickets at S406. The print submission module 118, 234 of the device 100, 220 presents the list of the accessible job tickets to the user using the GUI at S408. The device receives a user-selection for a job ticket that the user desires to apply to the print job using the GUI at S410. As mentioned, the job ticket already includes assigned print parameters. Therefore, the user can select the job ticket that includes the desired parameters for rendering the print output. Furthermore, the user can select the target printer device 104 and/or print engine 106 for selectively rendering the output.

With continued reference to FIG. 4, the method includes executing the print request at S412. More specifically, the print submission module 118, 234 provides the server 202 with the job ticket selection, the target printer device 104, and the print job at S414, which is, for example, a document received at the image source, such as, for example, a scanner, or a document stored in the memory 110, 224 of the device 100, 220. In one embodiment, the device 100, 220 can send the ticket selection to the server 202 with instructions (e.g. a path) for providing the server 202 with access to the print job being stored on a different device.

With continued reference to FIG. 4, the selected print job ticket is obtained from the repository 210 at the server 202 at S416. The method includes processing the print job at S418. The print job is processed while applying the job ticket and sending a resultant print file to the image forming device 104. The processing at S418 more specifically includes applying the selected print job ticket to the print job to form a print file that the target print device 104 and/or print engine 106 can consume at S420. The applying includes associating the print job ticket to the print job in the print job file. It should be noted that in a contemplated embodiment, the print job ticket can be subsequently applied to other print job requests such that it is not limited to one association with the current print job request. In this manner, the server 202 can forward an already-rendered job (e.g., a previously rendered job) to the image forming device 104 with the print ticket. Furthermore, the server 202 is adapted to hold the print job when the workflow is a follow-me print service. In this manner, the server can execute the above-mentioned process when it receives an indication that the user selected the print job using the follow-me print service on the image forming system 100.

With continued reference to FIG. 4, the server 202 provides the print job file to the target image forming device 104 and/or engine 106 at S422. The image forming system 100 receives the print job file transmitted from the server 202 and uses the print file to render a print output in a conventional manner at S424. In yet another embodiment, the system 200 can postpone a release of the rendering of the output until it determines receipt of a password or performs a similar authorization operation. If the second device used to create the job ticket at S312 was the mobile client device 220, the image rendering system 100 can strip parameters included in the job ticket that cannot be executed based on the capabilities of the image forming device before printing. The method ends at S426.

In the contemplated embodiment, the workflow service is adapted to provide a mechanism for managing the print tickets in the repository. The service can provide the user with options to add, delete, and rename ticket folders, to modify folder types/names, to modify access lists to folders, and to add/delete/rename job tickets included in the folders.

Although the methods are illustrated and described above in the form of a series of acts or events, it will be appreciated that the various methods or processes of the present disclosure are not limited by the illustrated ordering of such acts or events. In this regard, except as specifically provided, some acts or events may occur in different order and/or concurrently with other acts or events apart from those illustrated and described herein in accordance with the disclosure. For example, in one follow-me workflow embodiment, the print ticket can be selected from the printing device (using a local UI) at S406-S410 at a time different from when the print request is executed (see FIG. 4). It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

Figure 5:
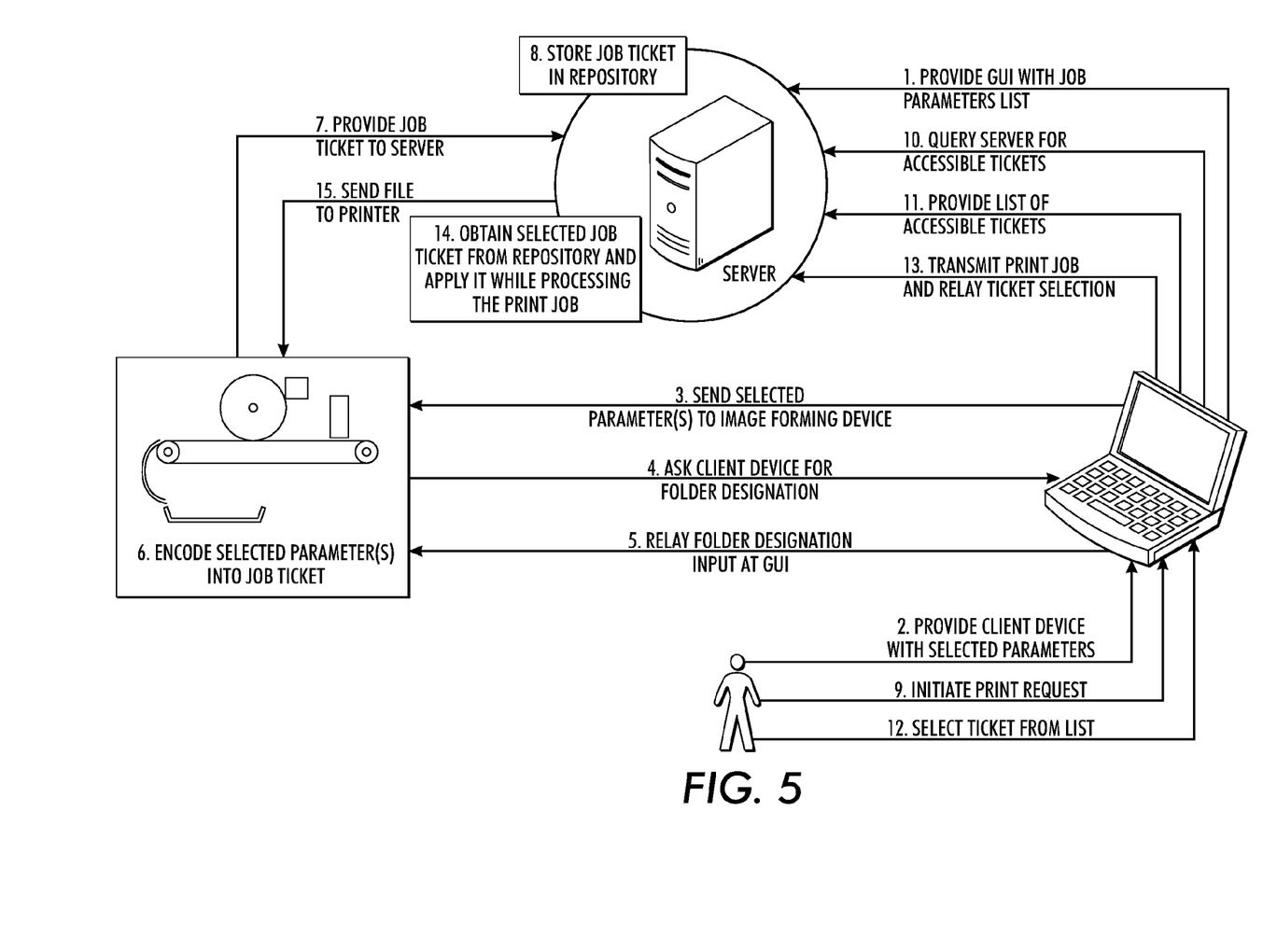
FIG. 5 is an illustrative implementation of the method according to one embodiment.

EXAMPLE IMPLEMENTATION 1:

Now referring to FIG. 5, an illustrative implementation of the method is shown according to one embodiment. FIG. 5 shows a multifunction printer apparatus as the image forming device and a handheld computer, such as a laptop, as a handheld mobile client device. The server provides the user with a job parameters list (see 1), which is displayed by the handheld computer. The user can input select parameters (see 2) from the list using a keyboard, trackball, mouse, or other conventional input means provided on the computer interface. The computer sends the parameters to the printer device (see 3). The printer device then encodes the selected parameters into a job ticket (see 6). Otherwise, in response to the received parameters, the printer device can ask the mobile device for a job ticket folder designation. In the same manner as was performed for the job parameters list, the computer can display the request and/or a list of accessible folders to the user (see 4), receive the folder designation as user input (see 5), and relay the folder designation to the image forming device (see 6). The printer device then encodes the selected parameters into a job ticket (see 6).

With continued reference to FIG. 5, the printer device provides the job ticket to the server (see 7). The printer device furthermore provides the server with the folder designation if one was made by the user. The server stores the job ticket in a repository (see 8) until a print request is received. In the example implementation, the print request is submitted by the user at the computer (see 9) and includes a target printer designation. In response to the print request, the computer queries the server for accessible tickets (see 10) and receives the list provided by the server (see 11). The GUI on the computer displays the list of accessible tickets for the user to review. The computer can receive a user-selection as input through its GUI (see 12). The computer transmits the ticket selection and the print job to the server (see 13), which obtains the selected job ticket from a repository and applies it to the print job (see 14) to form a print job file. The server sends the file to the printer device (see 15), which uses the file to render the print output.

EXAMPLE IMPLEMENTATION 2

Figure 6:
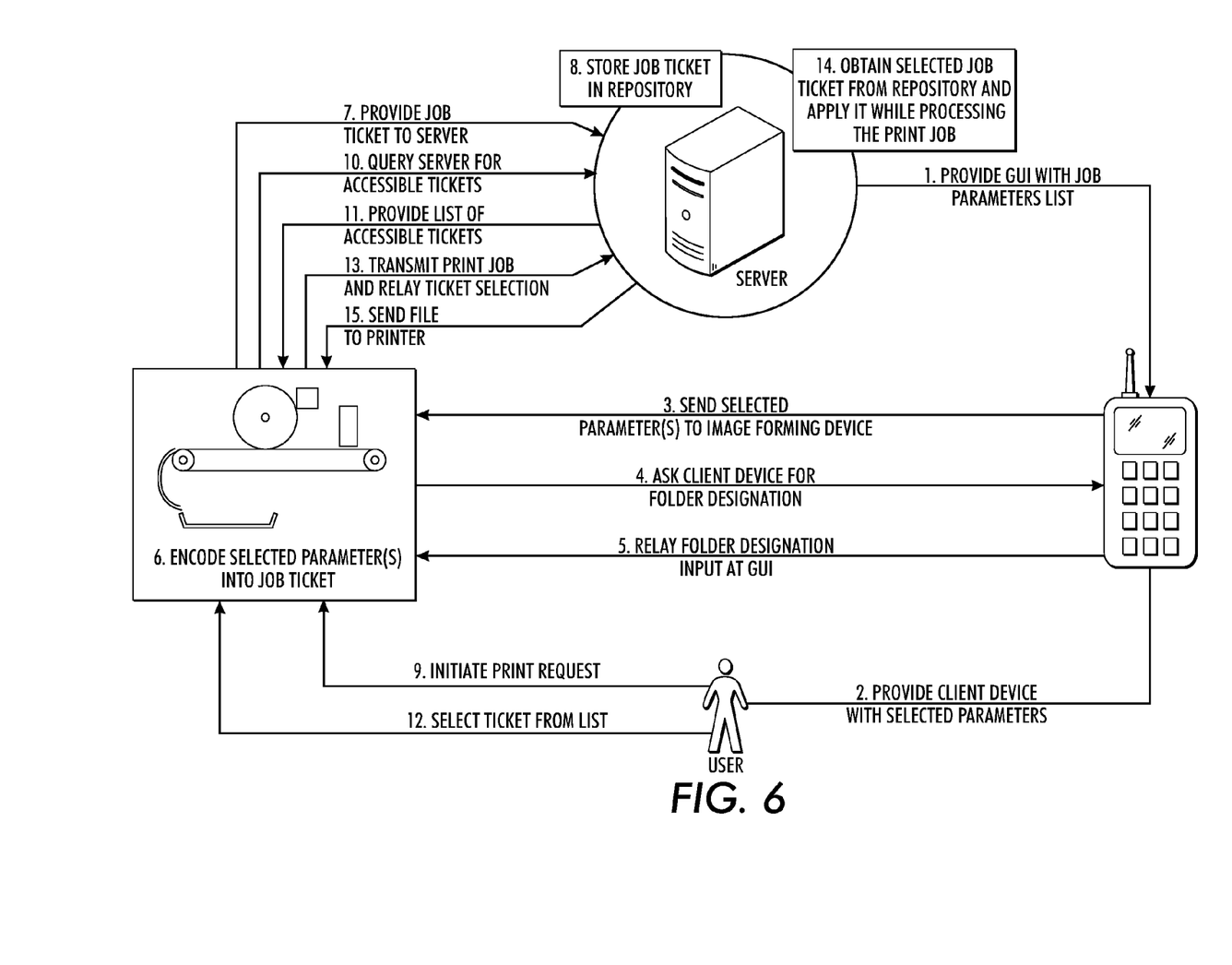
FIG. 6 is an illustrative implementation of the method according to one embodiment.

Now referring to FIG. 6, an illustrative implementation of the method is shown according to one embodiment. FIG. 5 shows a multifunction printer apparatus as the image forming device and a mobile smart phone as a handheld mobile client device. The server provides the user with a job parameters list (see 1), which is displayed by the phone. The user can input select parameters (see 2) from the list using a keyboard, trackball, or other conventional input means provided on the phone interface. The phone sends the parameters to the printer device (see 3). The printer device then encodes the selected parameters into a job ticket (see 6). Otherwise, in response to the received parameters, the printer device can ask the phone for a job ticket folder designation. In the same manner as was performed for the job parameters list, the phone can display the request and/or a list of accessible folders to the user (see 4), receive the folder designation as user input (see 5), and relay the folder designation to the printer device (see 6). The printer device then encodes the selected parameters into a job ticket (see 6).

With continued reference to FIG. 5, the printer device provides the job ticket to the server (see 7). The printer device furthermore provides the job ticket with the folder designation if one was made by the user. The server stores the job ticket in a repository (see 8) until a print request is received. In the example implementation, the print request is submitted at the printer device (see 9). In response to the print request, the printer device queries the server for accessible tickets (see 10) and receives the list provided by the server (see 11). The GUI on the printer device displays the list of accessible tickets for the user to review. The printer device can receive a user-selection as input through its GUI (see 12). The printer device transmits the ticket selection and the print job to the server (see 13), which obtains the selected job ticket from a repository and applies it to the print job (see 14) to form a print job file. The server sends the file to the printer device (see 15), which uses the file to render the print output.

EXAMPLE IMPLEMENTATION 3

A user, for example, a real estate salesperson, has a Xerox WorkCentre 5687 PCL6 driver installed at a Windows workstation and configured to send the Xerox Cloud Printing service. Using the printer driver, the user submits a print ticket with "Color, duplex, z-fold, enhanced image quality" settings to the Cloud Print service. The user specifies that this ticket be named "Brochure" and stores it in a private folder called "s_smith" that only the user has access to. The user submits another print ticket with "Color, simplex, glossy paper type, photo image quality, secure print" to the same folder and names this ticket "Secure Pictures".

The user later takes several pictures of a house that will be listed using the smart phone. The user initiates the print to Xerox Cloud feature to print these pictures. The print request lets the user select the printer and provides the list of print tickets that can be used. The user may select, for example, a ColorQube 9203 printer located in the user's office and the "Secure Pictures" print ticket to execute the print request. Using the Xerox Global Printer Driver, the Xerox Cloud Service renders the user's pictures while applying the "Pictures" print ticket to a postscript file and submits the postscript file to the ColorQube 9203 where the job will be printed correctly on glossy paper with photo image quality when the user releases the job using a secure print passcode.

One aspect of the disclosure is that the system provides a simple and convenient mechanism for a user to specify advance printing features when executing a cloud or follow-me print job request. In particular, the system enables this capability when printing requests are submitted at a (handheld) client device including a small interface. In particular, a print job submission consists of only a few basic steps and is easy to execute on hand held devices.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A job ticket managing system including an image forming system in communication with an associated server for managing job tickets, the system comprising:

a processor adapted to:

receive as input job parameters for managing a print job, transmit a request to an associated client device for at least one of a ticket folder specification and operating information of the associated client device, and receive from the associated client device the at least one of the ticket folder specification and the operating information;

a print driver adapted to:

encode the job parameters, at least one ticket folder specification, and operating information into a job ticket, and send the job ticket to the associated server before a request for a print job is initiated; and a marking engine adapted to:

receive from the associated server a job file including a print job and the job ticket after the associated server receives a request for executing the print job including a designation for the marking engine.

2. The system of claim 1, further comprising:

a communication interface in communication with the associated client device, the communication interface adapted for receiving the job parameters transmitted from the associated client device.

3. The system of claim 2, wherein the associated client device is a mobile client device.

4. The system of claim 1, wherein the print driver is further adapted to:

determine if a print driver capability meets the job parameter; and, remove the job parameter if the image forming device cannot execute a print job based on the print driver capability.

5. The system of claim 1, the processor is further adapted to:

receive a request for a print job and relay the request to the server.

6. A system for managing job tickets, comprising:

a first device, the first device adapted to:

receive as input job parameters for managing a print job;

encode the job parameters into a job ticket;

send the job ticket to a server;

a server in communication with the first device, the server adapted to:

store the job ticket in a folder, receive a query for accessible job tickets;

transmit a list of the accessible tickets stored at the server to a user interface in communication with the server;

receive a ticket selection from the list and obtain the job ticket from the folder when a request for a print job is received at the server, apply the job ticket to the print job, and transmit a print file including the print job and the job ticket to an image forming device when a print job request is received.

7. The system of claim 6, wherein the server is further adapted to:

provide a list of print job parameters to the user interface in communication with the server.

8. The system of claim 6, wherein the server is adapted to:

receive an instruction indicating a select folder for storing the job ticket; and, store the job ticket in the select folder.

9. The system of claim 6, wherein the server is adapted to create a folder for storing the job ticket.

10. The system of claim 6, wherein the user interface is included on the first device.

11. The system of claim 6, wherein the user interface is included on a second device different from the first device.

12. The system of claim 6, wherein first device is the image forming device that includes a marking engine adapted to render the print job as output.

13. The system of claim 6, wherein the first device is a mobile client device in communication with the server.

14. A method for managing job tickets, comprising:

receiving job parameters at a first device for creating a job ticket;

encoding the job parameters into a job ticket at the first device;

transmitting by the first device the job ticket to an associated server for storing the job ticket;

subsequently providing a print job request to the associated server;

providing the print job to the associated server with a request for the job ticket by a second device;

receiving at an image forming device a print file from the associated server, the print file including the print ticket obtained from a repository at the associated server and applied to the print job.

15. The method of claim 14, further comprising:

storing the job in a designated folder at the repository.

16. The method of claim 14, further comprising:

using the print file to render an output of the print job.

17. The method of claim 14, wherein the first device is a mobile client device.

18. The method of claim 14, wherein the first device is different from the second device.

19. The method of claim 14, wherein the first device is the same as the second device.

* * * * *